United States Patent Office 3,291,804
Patented Dec. 13, 1966

3,291,804
ALKOXYETHOXYPOLYCHLOROPYRIDINES
Howard Johnston, Walnut Creek, and Mary S. Tomita, Glendale, Calif., assignors to The Dow Chemical Company, Midland, Mich., a corporation of Delaware
No Drawing. Filed Dec. 14, 1964, Ser. No. 418,277
5 Claims. (Cl. 260—297)

This application is a continuation-in-part of our prior application Serial No. 289,722, filed June 21, 1963, now abandoned.

This invention is directed to alkoxyethoxypolychloropyridines, more particularly to 4-(2-alkoxyethoxy)polychloropyridines having the formula

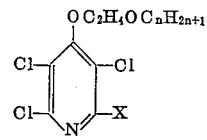

In this and succeeding formulas, X is chloro or hydrogen and $n$ is an integer of from 1 to 4, inclusive. The new compounds are generally colorless or light colored solids or liquids although sometimes obtained with orangish color. The compounds are soluble in numerous organic solvents such as carbon tetrachloride, perchloroethylene, diethyl ether, pentane, hexane, acetone, diisopropyl ether, etc. and substantially insoluble in water. The compounds are useful for the control of helminths infesting warm blooded animals as well as for the control of microorganisms, insects, soil dwelling parasites and undesirable plant pests.

The compounds of the present invention may be prepared by mixing together and reacting sodium 2-alkoxyethoxide and an appropriate polychloropyridine compound having the formula

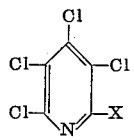

whereupon the desired 4-(2-alkoxyethoxy)polychloropyridine compound and sodium chloride by-product are formed. In the preparation, the amounts of the reactants to be employed are not critical, some of the desired product being obtained when any proportion of the ingredients is employed. Good results are obtained when substantially equimolecular proportions of sodium 2-alkoxyethoxide and polychloropyridine compound are employed. The reactants are preferably brought together in an alkoxyethanol solvent corresponding to the sodium 2-alkoxyethoxide reactant. The reaction is conveniently carried out at temperatures from ambient temperature to temperatures of about 130° C. The reaction is preferably carried out in the temperature range of from about 60° to about 120° C. During the heating the desired product and sodium chloride by-product are formed in the reaction medium with the sodium chloride precipitating therefrom. The resulting mixture is filtered to remove the sodium chloride and the filtrate subjected to reduced pressure distillation to remove the 2-alkoxyethanol solvent and to recover the desired product as residue. The product may be purified by any conventional purification procedure such as distillation, washing with water and/or organic solvent, extracting with an organic solvent, or a combination of these procedures or modification thereof. When the product is a solid, it may be purified by recrystallization from such solvents as hexane or pentane.

In a preferred method for carrying out the reaction, sodium 2-alkoxyethoxide is prepared in situ by adding metallic sodium to excess 2-alkoxyethanol to produce an alkoxyethanol dispersion of sodium 2-alkoxyethoxide and thereafter adding with stirring to the resulting mixture, the appropriate polychloropyridine compound. The resulting mixture is heated with stirring from about 2 to 10 hours to obtain the desired 4-(2-alkoxyethoxy)polychloropyridine product. Following the reaction, the product is separated and purified as previously described.

The following examples illustrate the invention but are not to be construed as limiting.

*Example 1.—4-(2-n-butoxyethoxy)-2,3,5-trichloropyridine*

1.3 grams (0.057 gram atom) of sodium was added slowly in small portions to 60 grams (0.51 mole) of 2-n-butoxyethanol while the temperature was maintained from about 25° to 35° C. to obtain sodium 2-n-butoxyethoxide. To the resulting mixture of sodium 2-n-butoxyethoxide in 2-n-butoxyethanol was added 10.9 grams (0.05 mols) of 2,3,4,5-tetrachloropyridine and the resulting mixture heated at about 70° C. for about four hours to obtain a 4-(2-n-butoxyethoxy)-2,3,5-trichloropyridine product and sodium chloride by-product. The reaction mixture was then poured into ice water and the resulting mixture extracted successively with methylene dichloride and ether to effect a separation between the organic materials and the sodium chloride which remained in the aqueous phase. The combined extracts were dried and then subjected to distillation operations which were completed at 168° C. and 3 millimeters of mercury pressure to remove the solvents and unreacted starting materials and to recover the desired 4-(2-n-butoxyethoxy)-2,3,5-trichloropyridine product having a molecular weight of 298.6 as a light orange oil. The product had elemental analyses (in percent) as follows:

| | Carbon | Hydrogen | Chlorine |
|---|---|---|---|
| Theory | 44.2 | 4.68 | 35.8 |
| Found | 44.24 | 4.53 | 35.72 |

*Example 2.—4-(2-methoxyethoxy)-2,3,5-trichloropyridine*

In a manner similar to that described in Example 1, sodium 2-methoxyethoxide was prepared by adding 1.1 gram (0.048 gram atom) of sodium to 43.0 grams (0.56 mole) of 2-methoxyethanol. To the resulting mixture of sodium 2-methoxyethoxide in 2-methoxyethanol was added with stirring 10 grams (0.046 mole) of 2,3,4,5-tetrachloropyridine and the resulting mixture heated at about 60° C. for about two hours to obtain the desired 4-(2-methoxyethoxy)-2,3,5-trichloropyridine product and sodium chloride by-product which precipitated in the reaction mixture during the heating. After completion of the heating the mixture was filtered to remove the precipitated sodium chloride by-product and the filtrate subjected to reduced pressure distillation at about 100° C. and 22 millimeters of mercury pressure to remove the excess 2-methoxyethanol and to recover the product as an orange-yellow oil. The product, when purified by distillation, was a colorless liquid having a boiling point of 133°–135° C. at 1.9 millimeters of mercury pressure.

*Example 3.—4-(2-methoxyethoxy)-2,3,5,6-tetrachloropyridine*

In a manner similar to that previously described, sodium 2-methoxyethoxide was prepared by reacting 2.3 grams (0.10 gram atom) of sodium with excess (86 grams) 2-methoxyethanol. To the resulting mixture was added 23 grams (0.092 mole) of pentachloropyridine and the resulting mixture heated in the temperature range of om about 90° C. to 100° C. for about four hours to obtain the desired 4-(2-methoxyethoxy)-2,3,5,6-tetrachloropyridine product and sodium chloride by-product which recipitated in the reaction mixture. The reaction mixure was then filtered to remove the sodium chloride and the filtrate was heated to a temperature of 150° C. and 2 iillimeters of mercury pressure to distill off the excess -methoxyethanol. The residue was thereafter washed ith water and extracted into hexane. The hexane soluon was dried and the solvent vaporized off to recover an il as residue from which, on standing, the desired 4-(2-1ethoxyethoxy) - 2,3,5,6-tetrachloropyridine crystallized ut. The crystals were filtered off and recrystallized from exane to obtain a purified product having a melting point f 51°–52° C. The product had elemental analyses in ercent as follows:

|  | Carbon | Hydrogen | Chlorine |
|---|---|---|---|
| heory | 33.1 | 2.41 | 48.6 |
| ound | 33.32 | 2.62 | 48.6 |

*Example 4*

In a manner similar to that described in the foregoing xamples, the following compounds are prepared:

4-(2-n-butoxyethoxy)-2,3,5,6 - tetrachloropyridine havig a boiling point of 162°–165° C. at 2.2 millimeters of lercury pressure by the reaction of sodium with 2-n-utoxyethanol to form sodium 2-n-butoxyethoxide, folwed by the reaction of the latter pentachloropyridine.

4-(2-n-propoxyethoxy)-2,3,5,6-tetrachloropyridine havig a molecular weight of 319 by the reaction of sodium ith 2-n-propoxyethanol to obtain sodium 2-n-propoxythoxide, followed by the reaction of the latter with pentahloropyridine.

4-(2-ethoxyethoxy)-2,3,5,6-tetrachloropyridine having molecular weight of 305 by the reaction of sodium with -ethoxyethanol to obtain sodium 2-ethoxyethoxide, folwed by the reaction of the latter with pentachloropyriline.

4 - (2 - ethoxyethoxy)-2,3,5-trichloropyridine having a nolecular weight of 270 by the reaction of sodium with -ethoxyethanol to obtain sodium 2-ethoxyethoxide, folowed by the reaction of the latter with 2,3,4,5-tetrahloropyridine.

4-(2-isopropoxyethoxy)-2,3,5-trichloropyridine having molecular weight of 284 by the reaction of sodium with -isopropoxyethanol to obtain sodium 2-isopropoxyethoxde, followed by the reaction of the latter with 2,3,4,5-etrachloropyridine.

The products of the present invention are useful as esticides and are adapted to be employed as toxic contituents of various pesticidal compositions for the conrol of such pests as mites, insects, nematodes, animal arasites and microorganisms.

The compounds are particularly useful for incorporaion in anthelmintics for the control of parasites infesting varm-blooded animals such as trichostrongylids, pinworms, ascarids, roundworms and tapeworms. In a representative application for the control of helminths, 4-(2-methoxyethoxy) - 2,3,5 - trichloropyridine, 4-(2-n-butoxyethoxy)-2,3,5-trichloropyridine and 4-(2-butoxyethoxy)-2,3,5,6-tetrachloropyridine are administered in separate operations to mice infested with trichostrongylids by incorporating in the diet at a rate of 0.06 percent by weight of said diet for about a week to obtain excellent controls of the helminths as ascertained by sacrificing and examining the mice at the end of the period.

Another representative useful application is in nematode control. In such application, 4-(2-methoxyethoxy)-2,3,5,6-tetrachloropyridine is dispersed in water to prepare a composition containing the compound in an amount of 25 parts by weight per million parts of dispersion. The composition when applied to nematode infested soil and then planted to cucumbers gives 100 percent controls of the nematodes.

As antimicrobial agents, the compounds may be employed as active toxic ingredient of germicidal compositions as well as antimicrobial agents for agricultural or horticultural purposes. Thus, the compounds are useful for the control of such organisms as, for example, *S. aureus, P. pullulans, R. nigricans, V. alboatrum* and *C. beticola.* In a representative operation demonstrating antimicrobial properties, 4 - (2 - butoxyethoxy)-2,3,5,6-tetrachloropyridine and 4 - (2-methoxyethoxy)-2,3,5-trichloropyridine, in separate operations, are added to samples of yeast agar media to give a concentration of 2 percent by weight in the media and the resulting media separately inoculated with P. pullulans and R. nigricans, and incubated at 30° C. for about 3 days. At the end of this period, complete inhibition of growth of the organisms is observed in each case.

We claim:
1. A 4-(2-alkoxyethoxy)polychloropyridine having the formula

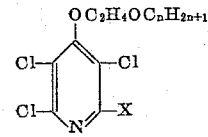

wherein X is selected from the group consisting of chloro and hydrogen and *n* is an integer of from 1 to 4, inclusive.
2. 4-(2-n-butoxyethoxy)-2,3,5-trichloropyridine.
3. 4-(2-methoxyethoxy)-2,3,5-trichloropyridine.
4. 4-(2-methoxyethoxy)-2,3,5,6-tetrachloropyridine.
5. 4-(2 - n - butoxyethoxy)-2,3,5,6-tetrachloropyridine.

References Cited by the Examiner

UNITED STATES PATENTS 3,256,290  6/1966  Johnston et al. _____ 260—297

WALTER A. MODANCE, *Primary Examiner.*

ALAN L. ROTMAN, *Assistant Examiner.*